United States Patent [19]
Okano et al.

[11] 3,985,405
[45] Oct. 12, 1976

[54] GAS BEARING ASSEMBLY

[75] Inventors: Hiroshi Okano; Teru Morishita, both of Susono, Japan

[73] Assignee: Toyota Jidosha Kogyo Kabushiki Kaisha, Japan

[22] Filed: Aug. 29, 1974

[21] Appl. No.: 501,832

[30] Foreign Application Priority Data
Jan. 24, 1974 Japan............................ 49-10029[U]

[52] U.S. Cl............................ 308/9; 308/DIG. 1
[51] Int. Cl.² ......................................... F16C 32/06
[58] Field of Search ............... 308/9, 26, 36.3, 122, 308/DIG. 1

[56] References Cited
UNITED STATES PATENTS
1,595,744  8/1926  Trumpler......................... 308/26 X
3,687,506  8/1972  Dee....................................... 308/9

FOREIGN PATENTS OR APPLICATIONS
1,274,089  9/1961  France........................... 308/DIG. 1
1,042,033  9/1966  United Kingdom................ 308/122

Primary Examiner—Robert J. Spar
Assistant Examiner—Randolph A. Reese
Attorney, Agent, or Firm—Toren, McGeady and Stanger

[57] ABSTRACT

In a gas bearing assembly for a rotary shaft which includes a plurality of arcuate bearing pads concentrically arranged around the shaft with one of the pads being disposed such that it does not receive the load of the shaft, there is provided a spring which imparts to the leading edge of the unloaded pad a biasing force directed radially inwardly relative to the shaft.

5 Claims, 2 Drawing Figures

GAS BEARING ASSEMBLY

BACKGROUND OF THE INVENTION

The present invention relates generally to a gas bearing of the dynamic pressure type and more particularly to a bearing wherein a rotary shaft is supported by an air layer under pressure formed between the shaft and a plurality of circumferentially disposed bearing pads.

Prior art gas bearings of the dynamic pressure type are constructed with a plurality of bearing pads equidistantly spaced about a rotary shaft supported by the bearing. Usually, at least three pads are provided with each pad having an arcuate sectional profile. Each of the pads is mounted upon a pivotal support member disposed toward the leading edge of the pad taken relative to the direction of rotation of the shaft. As a result, the rotation of the shaft operates to create a so-called "wedge action" which establishes an air film within the clearance between each of the pads and the shaft. As a result, the shaft is smoothly supported during its rotative movement.

Some of the pads are arranged to receive the load of the shaft with one of the pads being arranged so that it does not receive the load of the shaft. The pads which receive the shaft load, hereinafter referred to as load-bearing pads, are supported by pivots which are fixed to stationary supports. The remaining pad which does not receive the shaft load, hereinafter referred to as the non-load bearing pad, is supported by a pivot which is attached to a stationary support through a resilient interconnecting arm.

In a case where the rotary shaft is supported in a horizontal position, it therefore occurs that at a low rotational speed of the shaft the non load-bearing pad tends to drop or become displaced by the force of its own weight thereby coming into contact with the shaft. This usually occurs where a low level of air pressure is developed in the clearance between the pad and the shaft. Under such circumstances, the pad cannot be held in a stable position and it becomes susceptible to dislocation as a result of disturbances created in the bearing assembly. As a result, noise will be produced due to irregular contact of a portion of the dislocated pad with the shaft. Moreover, the pad will become subject to wear which tends to consequently shorten service life of the entire gas bearing assembly. Particularly, since the pad is supported by a pivotal mounting positioned toward its leading edge taken relative to the direction of rotation of the shaft, its trailing edge is more likely to come into contact with the rotation shaft because of the positional instability of the pad.

The present invention is aimed at providing an improvement in a gas bearing assembly whereby smooth rotational characteristics of the rotary shaft may be enhanced by eliminating the tendency of interference between a pad and the shaft even at low rotational speeds of the shaft.

The structure of the invention provides means whereby the pad which is not receiving the load of the shaft will be biased by a spring force directed radially inwardly of the shaft at the leading edge of the pad taken with respect to the direction of rotation of the shaft.

SUMMARY OF THE INVENTION

Briefly, the present invention may be described as an improvement in a gas bearing assembly for a rotary shaft including a plurality of pads concentrically arranged about said rotary shaft each defining an arcuate inner surface arranged to extend circumferentially of the shaft in proximity thereto, said pads being arranged such that there is provided at least one non-load bearing pad which does not receive the load of the shaft and at least a plurality of load-bearing pads which receive the load of the shaft, first pivot means connected to a fixed support and having said load-bearing pads pivotally supported thereon, and second pivot means connected to a fixed support through a resilient interconnecting member and having said non-load bearing pad pivotally supported thereon, each of said pads being positioned to have a leading edge and a trailing edge spaced apart circumferentially of said shaft, said leading edge and said trailing edge being defined relative to the direction of rotation of said shaft, with each of the pivot means being, respectively, connected to each of said pads on a side thereof toward said leading edge, said improvement comprising spring means connected to impart a force biasing said non-load bearing pad radially inwardly of said shaft at a point proximate said leading edge.

The spring means is preferably configured to impart to the leading edge of the non-load bearing pad a spring force which is relatively small being of a magnitude which is about several times the weight of the pad. As a result, the spring force which is imparted will be negligible taken relative to the force imparted to the pad through operation of the shaft during high speed rotation thereof.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there are illustrated and described preferred embodiments of the invention.

DETAILED DESCRIPTION OF THE PREFERRED EMBODIMENTS

Figure 1:
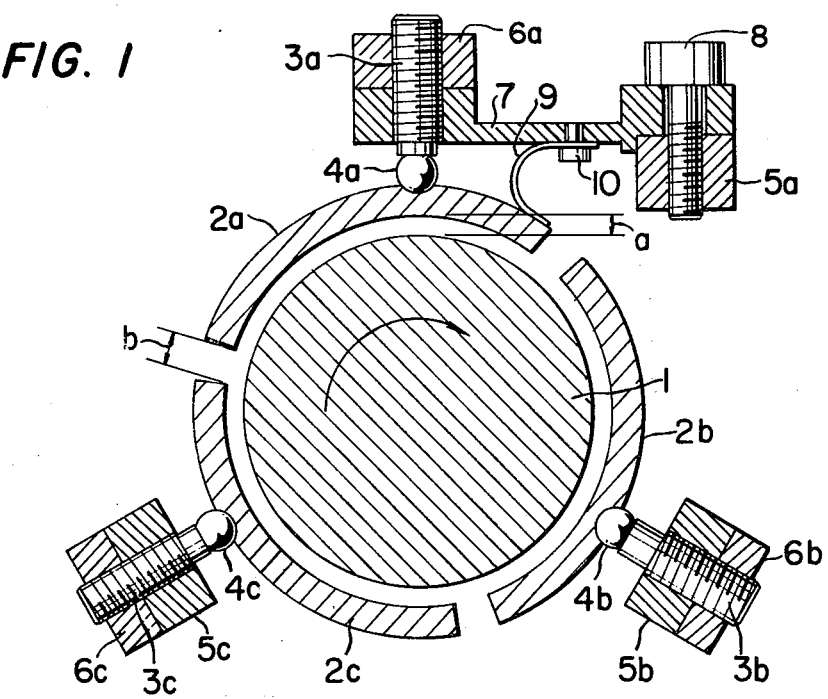
FIG. 1 is a sectional view of a gas bearing assembly of the dynamic pressure type having the present invention incorporated therein.

Referring now to the drawing, wherein like reference characters refer to similar parts in both figures thereof, there is shown a gas bearing of the dynamic pressure type which may be utilized as a bearing in an engine such as a gas turbine engine involving high temperature operation. Arranged around the outer periphery of a rotary shaft 1 rotatable in a clockwise direction there are provided three bearing pads 2a, 2b and 2c each having an arcuate inner surface extending circumferentially about the shaft 1 with the pads being angularly spaced apart by a suitable distance $b$. The inner arcuate surfaces of the pads are disposed proximate the outer periphery of the shaft 1 and spaced therefrom by a distance $a$.

Three mounting balls are pivotally connected to the pads 2a, 2b and 2c, respectively, with each ball being located on the side of its respective pad near the leading edge thereof taken with respect to the direction of rotation of the shaft 1. The balls 4a, 4b and 4c are mounted at the tips of pivot supports 3a, 3b and 3c, respectively, with the supports 3b and 3c operating to support, respectively, the pads 2b and 2c which receive the load of the shaft 1. Supports 3b and 3c are fixed, respectively, to stationary supports 5b and 5c by means of nuts 6b and 6c.

In operation, a clearance will be developed between the pad 2b or 2c and the shaft 1 which will assume a wedge-like shape becoming narrower toward the leading edge of the pad with respect to the direction of rotation of the shaft. That is, the wedge action of the air film which is produced will be created within the narrower clearance existing between the shaft and a pad as the shaft rotates.

The support 3a, mounting the pad 2a which does not receive the load of the shaft 1, is fixed by a nut 6a to one end of a resilient arm 7 with the other end of the arm 7 being fixed by a bolt 8 to a stationary support 5a. The clearance between the pad 2a and the shaft 1 will also assume a wedge-like shape. The leading edge of the pad 2a taken with respect to the direction of rotation of the shaft 1 is urged by a thin leaf spring 9 toward the shaft 1. The spring 9 has its stem fixed by a bolt 10 to the resilient arm 7, with the opposite end of the spring abutting the leading edge of the pad 2a in order to create thereat a biasing force directed radially inwardly of the shaft 1.

The biasing force imparted by the spring 9 to the pad 2a is set to be several times the weight of the pad 2a. As the shaft 1 rotates, the pressure created in the clearance between the pad 2a and the shaft 1 increases and reaches a high level. This high pressure far surpasses the spring force produced by the thin leaf spring 9, and as a result, at the time of high speed operation of the shaft 1 the force imparted by the spring 9 is negligible taken relative to the force imparted to the pad 2a through operation of the shaft during high speed rotation thereof. Thus, at the time of high speed rotation of the shaft 1 the existence of the spring 9 can be ignored.

With the thin leaf spring 9 biasing the pad 2a, the torque required to turn the shaft 1 is slightly increased at the time of the start of rotation of the shaft 1 or at the time of deceleration thereof immediately prior to its becoming stationary. At either time, the pressure on the inner side of the pad 2a is low but since the spring force of the thin leaf spring 9 is weak, it will produce no material effect upon the rotational characteristics of the shaft 1.

With a gas bearing structured as described, at a low rotational speed of the shaft 1 the air pressure caused by the wedge effect of the air film in the clearance between the shaft 1 and each of the pads 2a, 2b and 2c remains low so that the shaft 1 approaches the inner arcuate surfaces of the pads 2b and 2c by the force of its own weight. As a consequence, the clearance between the pad 2a, which is the non-load bearing pad and which does not receive the load of the shaft 1, and the shaft 1 is increased. As a result, the air pressure on the inner side of the pad 2a is reduced. This causes the pad 2a to tend to drop downwardly under the force of its own weight. However, since the pad 2a is biased at its leading edge toward the shaft 1 by the thin leaf spring 9, the clearance between the pad 2a and the shaft 1 can be maintained at a sufficient level with a wedge-like configuration even under low air pressure operation. As a result, the wedge action of the air film can be maintained and established with stability. In this way, the shaft 1 can be supported with relative stability by the combined action of the pads 2a, 2b and 2c.

With increase of the speed of the shaft 1, the pressure in the clearance between the shaft 1 and each pad 2a, 2b and 2c is increased due to the wedge action of the air film. With such pressure increase, the pad 2a is moved against the spring force of the leaf spring 9 so that the clearance at the respective pads 2a, 2b and 2c will assume substantially the same wedge-like form. In this way, the shaft 1 may be supported with stability and enabled to rotate smoothly.

Figure 2:
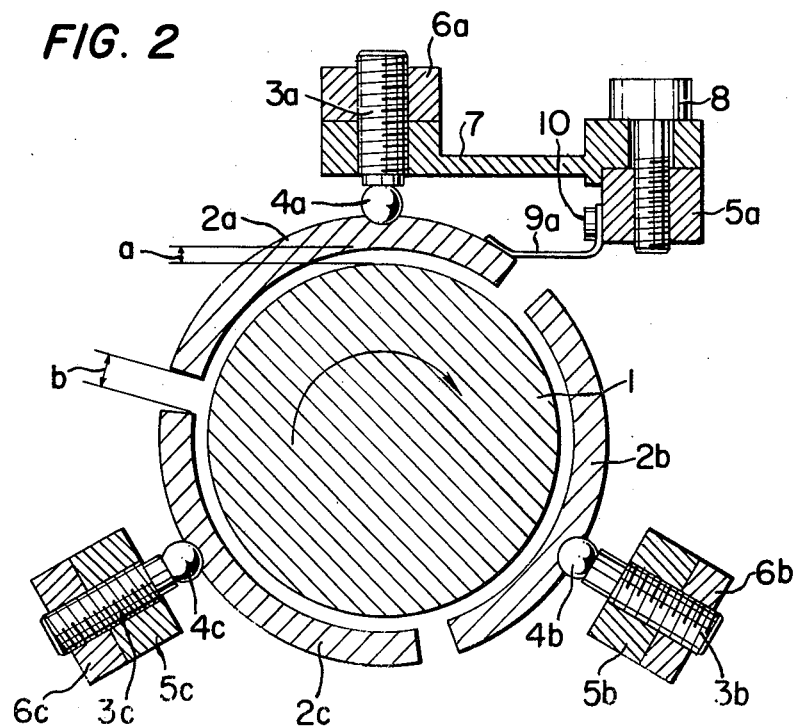
FIG. 2 is a sectional view showing another embodiment of the gas bearing of the present invention.

In FIG. 2 there is depicted a modification of the embodiment of FIG. 1 wherein the thin leaf spring 9 is replaced by a leaf spring 9a having a slightly different configuration and mounted in a slightly different manner. In the modification of FIG. 2 the modified spring 9a is formed with a generally L-shaped configuration having one leg thereof positioned to abut the leading edge of the pad 2a with its other leg being fixed by a bolt 10 to the stationary support 5a. In all other respects, the operation of the spring 9a is identical to that of the spring 9 shown in FIG. 1.

As will be seen from the foregoing description of a gas bearing structured in accordance with the present invention, the pad which does not receive the load of the shaft 1 is biased at its leading edge taken with respect to the direction of rotation of the shaft by a biasing force which is directed radially inwardly toward the shaft, said force being created by a thin leaf spring. Accordingly, the clearance between this pad and the shaft may be maintained at all times in a wedge-like configuration due to the air pressure which is built up within the clearance. Thus, even at low speed operation of the shaft the pad will not interfere with rotation of the shaft and hence it is possible to eliminate undesirable noise and to remarkably reduce the wear of the pad thereby elongating the surface life of the entire bearing assembly.

While specific embodiments of the invention have been shown and described in detail to illustrate the application of the inventive principles, it will be understood that the invention may be embodied otherwise without departing from such principles.

What is claimed is:

1. In a gas bearing assembly for a rotary shaft including a plurality of pads concentrically arranged about said shaft each defining an arcuate inner surface arranged to extend circumferentially of said shaft in proximity thereto, said pads being arranged such that there is provided at least one non-load bearing pad which does not receive the load of said shaft and at least a plurality of load-bearing pads which receive the load of said shaft, first pivot means connected to a fixed support and having said load-bearing pads pivotally supported thereon, and second pivot means connected to a fixed support through a resilient interconnecting member and having said non-load bearing pad pivotally supported thereon, each of said pads being positioned to have a leading edge and a trailing edge spaced apart circumferentially of said shaft and being defined relative to the direction of rotation of said shaft, with each of said pivot means being respectively connected to each of said pads at a point on the side of said pads toward the leading edge thereof, the improvement comprising spring means provided separately from said second pivot means connected to abut said non-load-bearing pad at said leading edge thereof at a point spaced from the point from which said second pivot means supports said non-load bearing pad to impart a force biasing said non-load bearing pad radially inwardly of said shaft at a point proximate said leading edge thereof.

2. An assembly according to claim 1 wherein said spring means is configured to impart to said non-load bearing pad a spring force which is approximately several times the weight of the pad.

3. An assembly according to claim 1 wherein said spring means is configured to impart to said non-load bearing pad a spring force which is negligible taken relative to the force imparted to said pad through operation of said shaft during high-speed rotation thereof.

4. An assembly according to claim 1 wherein said spring means comprises a spring member having an arcuate shape with one end fixed to said resilient interconnecting member and with its other end positioned to abut the leading edge of said non-load bearing pad.

5. An assembly according to claim 1 wherein said spring means comprises a spring member having a generally L-shaped configuration with one leg of said spring member being affixed to said fixed support for said second pivot means and with the other leg of said spring member being positioned to abut the leading edge of said non-load bearing pad.

* * * * *